US 9,929,394 B2

(12) United States Patent
Lee

(10) Patent No.: US 9,929,394 B2
(45) Date of Patent: Mar. 27, 2018

(54) SECONDARY BATTERY

(71) Applicant: SAMSUNG SDI CO., LTD., Yongin-si, Gyeonggi-do (KR)

(72) Inventor: Honghyeon Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 49 days.

(21) Appl. No.: 15/214,409

(22) Filed: Jul. 19, 2016

(65) Prior Publication Data

US 2017/0054133 A1    Feb. 23, 2017

(30) Foreign Application Priority Data

Aug. 19, 2015    (KR) .................. 10-2015-0116844

(51) Int. Cl.
| H01M 2/04 | (2006.01) |
| H01M 2/06 | (2006.01) |
| H01M 2/30 | (2006.01) |
| H01M 2/34 | (2006.01) |
| H01M 10/04 | (2006.01) |

(52) U.S. Cl.
CPC .............. *H01M 2/34* (2013.01); *H01M 2/043* (2013.01); *H01M 2/0473* (2013.01); *H01M 2/06* (2013.01); *H01M 2/30* (2013.01); *H01M 10/0431* (2013.01); *H01M 2200/00* (2013.01); *H01M 2220/20* (2013.01)

(58) Field of Classification Search
CPC ........ H01M 2/0473; H01M 2/06; H01M 2/30; H01M 2/34; H01M 10/0431; H01M 2200/00; H01M 2220/20
See application file for complete search history.

(56) References Cited

U.S. PATENT DOCUMENTS

| 8,480,763 B2 | 7/2013 | Nansaka et al. |
| 8,728,643 B2 | 5/2014 | Byun |

FOREIGN PATENT DOCUMENTS

| EP | 2551938 A1 | 1/2013 |
| EP | 2660896 A1 | 11/2013 |
| EP | 2757614 A1 | 7/2014 |
| EP | 2860786 A1 | 4/2015 |
| JP | 2010-212034 A | 9/2010 |
| JP | 2011-171079 A | 9/2011 |
| KR | 10-2013-0063247 A | 6/2013 |

OTHER PUBLICATIONS

EPO Extended Search Report dated Oct. 21, 2016, for corresponding European Patent Application No. 16184718.1 (7 pages).

*Primary Examiner* — Brittany Raymond
(74) *Attorney, Agent, or Firm* — Lewis Roca Rothgerber Christie LLP

(57) ABSTRACT

A secondary battery includes: an electrode assembly; a cap plate; a first terminal plate electrically connected to the electrode assembly, the first terminal plate being on the cap plate; and a current limiting plate between the first terminal plate and the cap plate, the current limiting plate including: a first surface accommodated in a first accommodation portion of the terminal plate, a second surface accommodated in a second accommodation portion of the cap plate, and a third surface extending between the first and second surfaces, wherein a first portion of the third surface is accommodated in the first accommodation portion, and a second portion of the third surface is accommodated in the second accommodation portion.

19 Claims, 6 Drawing Sheets

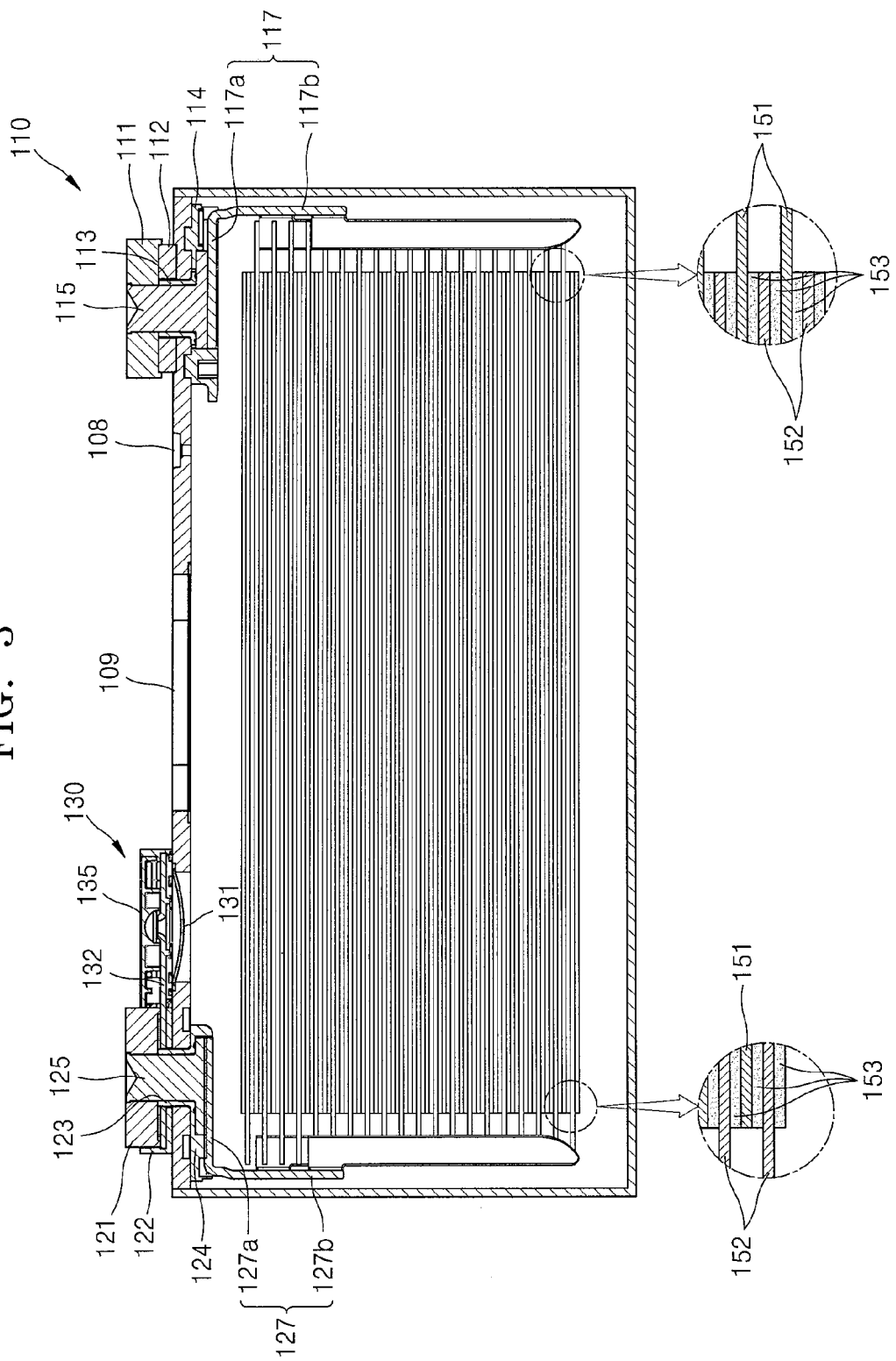

SECONDARY BATTERY

CROSS-REFERENCE TO RELATED APPLICATION

This application claims priority to and the benefit of Korean Patent Application No. 10-2015-0116844, filed on Aug. 19, 2015, in the Korean Intellectual Property Office, the disclosure of which is incorporated herein in its entirety by reference.

BACKGROUND

1. Field

One or more exemplary embodiments of the present invention relate to a secondary battery.

2. Description of the Related Art

Unlike primary batteries, secondary batteries are designed to be rechargeable. Secondary batteries are used as energy sources of devices such as mobile devices, electric vehicles, hybrid electric vehicles, electric bicycles, or uninterruptible power supplies. Single-cell secondary batteries or multi-cell secondary batteries (secondary battery modules), in which a plurality of battery cells are electrically connected, are utilized according to the types of external devices using the secondary batteries.

SUMMARY

One or more exemplary embodiments of the present invention include a secondary battery that may be manufactured through simple processes with low costs.

One or more exemplary embodiments include a secondary battery having a terminal structure that is resistant to rotation and/or twisting.

One or more exemplary embodiments include a secondary battery having improved durability against chemicals.

Additional aspects are set forth in part in the description which follows and, in part, will be apparent from the description, or may be learned by practice of the presented embodiments.

According to one or more exemplary embodiments, a secondary battery includes: an electrode assembly; a cap plate; a first terminal plate electrically connected to the electrode assembly, the first terminal plate being on the cap plate; and a current limiting plate between the first terminal plate and the cap plate, the current limiting plate including: a first surface accommodated in a first accommodation portion of the terminal plate, a second surface accommodated in a second accommodation portion of the cap plate, and a third surface extending between the first and second surfaces, wherein a first portion of the third surface is accommodated in the first accommodation portion, and a second portion of the third surface is accommodated in the second accommodation portion.

For example, the first and second surfaces may be main surfaces of the current limiting plate and may be opposite to each other, and the third surface may be a lateral surface of the current limiting plate.

For example, a third portion of the third surface of the current limiting plate may not be covered by the first and second accommodation portions.

For example, the third portion of the third surface of the current limiting plate may be exposed.

For example, the first accommodation portion may define a recess in the first terminal pate, and the second accommodation portion may define a recess in the cap plate.

For example, the first and second accommodation portions may be press fitted together.

For example, the first and second accommodation portions may entirely surround an outer periphery of the current limiting plate.

For example, the first and second accommodation portions may continuously surround an outer periphery of the current limiting plate.

For example, the first accommodation portion may surround a periphery along which the first and third surfaces of the current limiting plate meet, and the second accommodation portion may surround a periphery along which the second and third surfaces of the current limiting plate meet.

For example, the first and second surfaces of the current limiting plate may include insulative surfaces.

For example, the first and second surfaces of the current limiting plate may include TEFLON® coating layers.

For example, the third surface of the current limiting plate may include a conductive surface.

For example, the current limiting plate may include a metal plate including insulative coating layers on the first and second surfaces thereof.

For example, the first and second surfaces of the current limiting plate may be substantially flat.

For example, the first and second accommodation portions may directly contact the third surface of the current limiting plate.

For example, the first terminal plate and the cap plate may be electrically connected to each other through the third surface of the current limiting plate.

For example, penetration openings may be defined in the cap plate, in the current limiting plate, and in the first terminal plate for receiving a current collecting terminal that extends from the electrode assembly.

For example, the secondary battery may further include a second terminal plate having a polarity that is different from a polarity of the first terminal plate.

For example, the secondary battery may further include an insulative plate between the second terminal plate and the cap plate.

BRIEF DESCRIPTION OF THE DRAWINGS

These and/or other aspects will become apparent and more readily appreciated from the following description of the exemplary embodiments, taken in conjunction with the accompanying drawings in which:

FIG. 3 is a cross-sectional view taken along the line III-III of FIG. 1;

DETAILED DESCRIPTION

Figure 1:
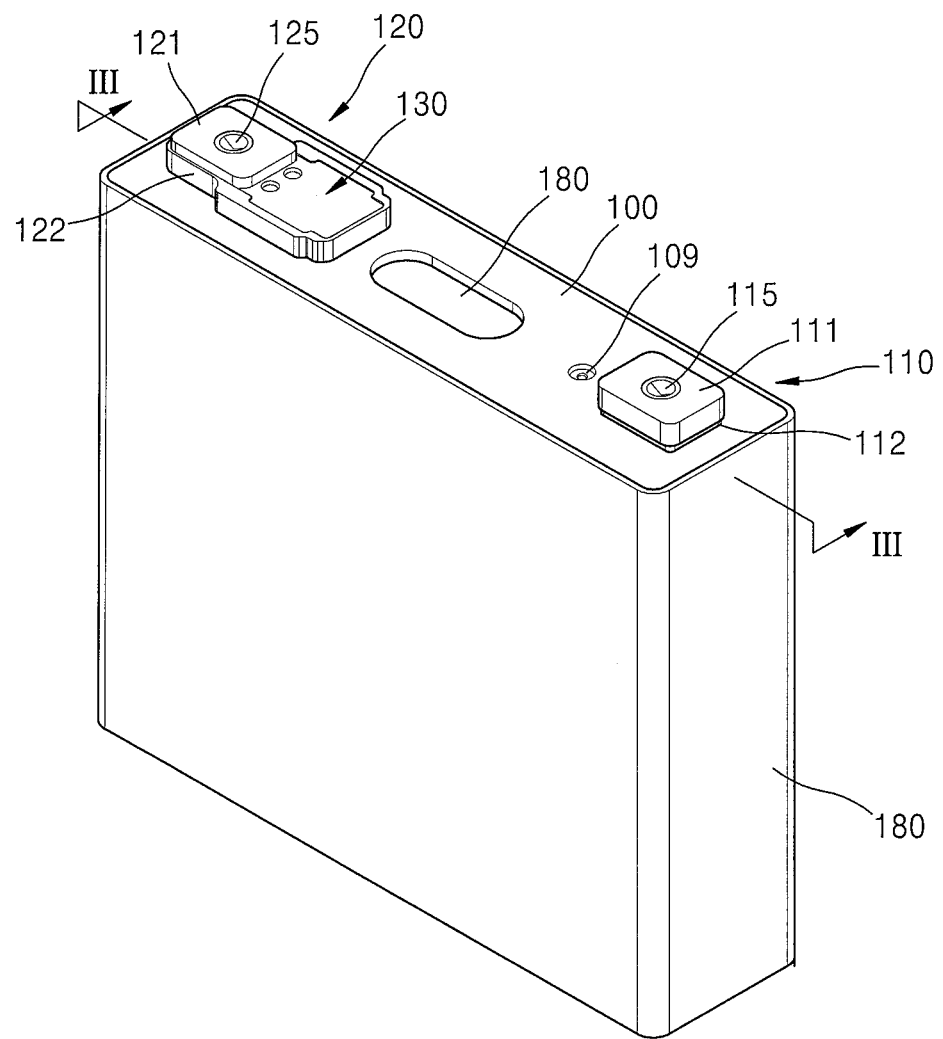
FIG. 1 is a perspective view illustrating a secondary battery according to one or more exemplary embodiments of the present invention.

Reference is made herein in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, a secondary battery is described with reference to the accompanying drawings, in which exemplary embodiments are shown.

Figure 2:
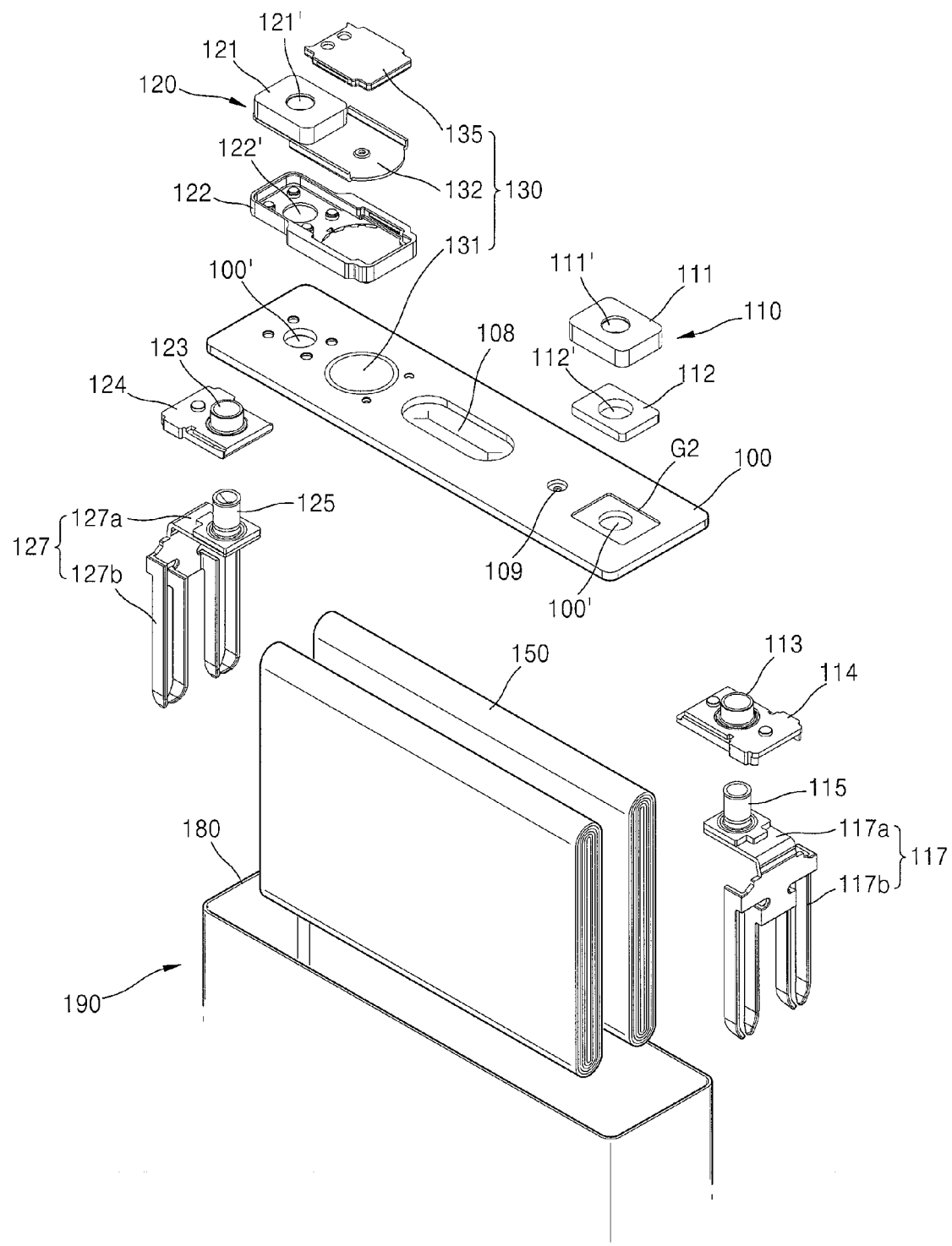
FIG. 2 is an exploded perspective view illustrating the secondary battery depicted in FIG. 1.

FIG. 1 is a perspective view illustrating a secondary battery according to one or more exemplary embodiments of the present invention, FIG. 2 is an exploded perspective view illustrating the secondary battery depicted in FIG. 1, and FIG. 3 is a cross-sectional view taken along the line III-III of FIG. 1.

Referring to FIGS. 1 to 3, in some embodiments, the secondary battery may include first and second electrode terminals 110 and 120 having different polarities and protruding outwardly. For example, the first and second electrode terminals 110 and 120 may be electrically connected to an electrode assembly 150 disposed inside the secondary battery. For example, the first and second electrode terminals 110 and 120 may be respectively electrically connected to first and second electrode plates 151 and 152 of the electrode assembly 150 so as to function as positive and negative electrode terminals for supplying power stored in the secondary battery to an external device or receiving power from an external charger. For example, the first and second electrode terminals 110 and 120 may be disposed on opposing sides of the secondary battery.

In some exemplary embodiments, a cap plate 100 of the secondary battery may be electrically connected to the electrode assembly 150 and may function as an electrode terminal. As such, in some embodiments, one of the first and second electrode terminals 110 and 120 may be omitted.

Referring to FIG. 2, the secondary battery includes the electrode assembly 150, the first and second electrode terminals 110 and 120, and first and second current collecting members 117 and 127 that respectively electrically connect the first and second electrode terminals 110 and 120 to the electrode assembly 150. In addition, the secondary battery may include a can 180 that accommodates the electrode assembly 150, and the cap plate 100 that seals an upper opening of the can 180. The cap plate 100 may be coupled to an upper side of the can 180 (in which the electrode assembly 150 is accommodated) to seal the upper opening of the can 180. For example, the cap plate 100 and the can 180 may be welded together along edges of the cap plate 100. The can 180 and the cap plate 100 together form a case 190, in which the electrode assembly 150 is accommodated. The case 190 is referred to herein as a structure including the can 180 and the cap plate 100. For example, as discussed further below, in some exemplary embodiments, the case 190 (e.g., the can 180 and the cap plate 100 that are joined together by a method such as welding) may form a short-circuit current path when the secondary battery is in an abnormal state.

The cap plate 100 may include a vent 108 that is configured to break when internal pressure of the can 180 exceeds (e.g., abnormally exceeds) a preset value, and thus may reduce the internal pressure of the can 180, and an electrolyte inlet 109 for injecting an electrolyte into the can 180 through the electrolyte inlet 109.

Referring to FIG. 3, the electrode assembly 150 may be disposed in the can 180 of the secondary battery. The electrode assembly 150 may include the first and second electrode plates 151 and 152 having different polarities, and a separator 153 disposed between the first and second electrode plates 151 and 152. The electrode assembly 150 may be a winding-type electrode assembly in which the first and second electrode plates 151 and 152 and the separator 153 are wound in the form of a jelly-roll, or may be a stacked-type electrode assembly in which first electrode plate(s) 151, separator(s) 153, and second electrode plate(s) 152 are alternately stacked.

The cap plate 100 may be coupled to the upper opening of the can 180 (in which the electrode assembly 150 is disposed) to seal the can 180. The first and second electrode terminals 110 and 120 that are electrically connected to the electrode assembly 150 may extend outwardly from the cap plate 100 to electrically connect the electrode assembly 150 to an external circuit or a neighboring secondary battery.

The first and second electrode terminals 110 and 120 may have different polarities and may be electrically connected to the first and second electrode plates 151 and 152 of the electrode assembly 150, respectively.

Referring to FIG. 2, the first electrode terminal 110 may include a first current collecting terminal 115 and a first terminal plate 111 coupled to the first current collecting terminal 115. Similarly, the second electrode terminal 120 may include a second current collecting terminal 125 and a second terminal plate 121 coupled to the second current collecting terminal 125. As used herein, the term "current collecting terminal" may be used to collectively refer to the first and second current collecting terminals 115 and 125 or to selectively refer to one of the first and second current collecting terminals 115 and 125. In addition, the term "terminal plate" may be used to collectively refer to the first and second terminal pates 111 and 121 or to selectively refer to one of the first and second terminal plates 111 and 121. For example, a terminal plate coupled to the first current collecting terminal 115 may refer to the first terminal plate 111, and a terminal plate coupled to the second current collecting terminal 125 may refer to the second terminal plate 121.

The first and second current collecting terminals 115 and 125 are respectively coupled to the first and second current collecting members 117 and 127. As used herein, the term "current collecting member" may be used to collectively refer to the first and second current collecting members 117 and 127 or to selectively refer to one of the first and second current collecting members 117 and 127. For example, a current collecting member coupled to the first current collecting terminal 115 may refer to the first current collecting member 117, and a current collecting member coupled to the second current collecting terminal 125 may refer to the second current collecting member 127.

The first and second current collecting terminals 115 and 125 may be inserted through the cap plate 100 and may extend outwardly from the cap plate 100.

As such, terminal openings (e.g., terminal holes) 100' may be formed in the cap plate 100 and may receive the first and second current collecting terminals 115 and 125. For example, the first and second current collecting terminals 115 and 125 may be inserted through the terminal holes 100' of the cap plate 100 in a direction from a lower side of the cap plate 100 to an upper side of the cap plate 100.

The first and second current collecting terminals 115 and 125 may penetrate the cap plate 100 and extend from the cap plate 100 so as to connect (e.g., electrically connect) the electrode assembly 150, which is located under the cap plate 100, to the first and second terminal plates 111 and 121, which are located above the cap plate 100. Lower portions of the first and second current collecting terminals 115 and 125 may be electrically connected to the electrode assembly 150 through the first and second current collecting members 117 and 127, respectively, and upper portions of the first and second current collecting terminals 115 and 125 may be electrically connected to the first and second terminal plates 111 and 121, respectively.

The first and second current collecting terminals 115 and 125 may be respectively connected to opposite polarities of the electrode assembly 150. That is, the first and second current collecting terminals 115 and 125 may respectively be connected to the first and second electrode plates 151 and 152 of the electrode assembly 150 (or the first and second current collecting members 117 and 127 coupled to the electrode assembly 150) according to the polarities of the first and second current collecting terminals 115 and 125.

For example, the first current collecting terminal 115 may be a positive electrode terminal, and the first current collecting member 117 and the first terminal plate 111 connected to the first current collecting terminal 115 may be disposed at a positive electrode side of the electrode assembly 150. The second current collecting terminal 125 may be a negative electrode terminal, and the second current collecting member 127 and the second terminal plate 121 connected to the second current collecting terminal 125 may be disposed at a negative electrode side of the electrode assembly 150.

The first and second current collecting terminals 115 and 125 penetrate the cap plate 100 and extend from the cap plate 100 to respectively electrically connect the first and second current collecting members 117 and 127 located under the cap plate 100 to the first and second terminal plates 111 and 121 located above the cap plate 100.

The first and second current collecting terminals 115 and 125 may be fixed at the upper portions thereof. For example, the upper portions of the first and second current collecting terminals 115 and 125 may be fixed to upper surfaces of the first and second terminal plates 111 and 121 by riveting. For example, the upper portions of the first and second current collecting terminals 115 and 125 may be inserted through the first and second terminal plates 111 and 121, respectively, so that the upper portions of the first and second current collecting terminals 115 and 125 protrude from an upper surface of the cap plate 100 (e.g., protrude by a predetermined length), and then the upper portions of the first and second current collecting terminals 115 and 125 may be respectively coupled to the first and second terminal plates 111 and 121 by pressing the upper portions of the first and second current collecting terminals 115 and 125 against the upper surfaces of the first and second terminal plates 111 and 121. Recesses may be formed in upper ends of the first and second current collecting terminals 115 and 125 using a tool that is rotated (e.g., rotated at a high speed), and the upper ends of the first and second current collecting terminals 115 and 125 may be laterally pushed by the tool and brought into contact (e.g., tight contact) with the upper surfaces of the first and second terminal plates 111 and 121. That is, the recesses may be formed in the upper ends of the first and second current collecting terminals 115 and 125, and flanges may extend widely from edges of the upper ends of the first and second current collecting terminals 115 and 125.

The lower portions of the first and second current collecting terminals 115 and 125 may include flange-shaped lips (or jaws) having an outer diameter that is greater than a diameter of the terminal holes 100' of the cap plate 100, and thus the first and second current collecting terminals 115 and 125 may not be easily separated from the terminal holes 100' of the cap plate 100. In some embodiments, the first and second current collecting terminals 115 and 125 are inserted into the terminal holes 100' of the cap plate 100 from the lower side of the cap plate 100, and when the lips (or jaws) of the first and second current collecting terminals 115 and 125 are supported on the lower side of the cap plate 100, the upper ends of the first and second current collecting terminals 115 and 125 exposed at the upper side of the cap plate 100 may be fixed by riveting.

When the first and second current collecting terminals 115 and 125 are electrically insulated from the cap plate 100, the first and second current collecting terminals 115 and 125 may be inserted through the terminal holes 100' of the cap plate 100. For example, seal gaskets 113 and 123 may be placed around the terminal holes 100', and then the first and second current collecting terminals 115 and 125 may be inserted into the terminal holes 100' so that the first and second current collecting terminals 115 and 125 may be insulated from the cap plate 100. The seal gaskets 113 and 123 may seal the terminal holes 100' to prevent or reduce the likelihood of leakage of the electrolyte contained in the can 180 and introduction of contaminants into the can 180.

Insulative members 114 and 124 may be respectively disposed under the seal gaskets 113 and 123. The insulative members 114 and 124 are respectively disposed between the lower side of the cap plate 100 and the first and second current collecting terminals 115 and 125 so as to insulate the first and second current collecting terminals 115 and 125 from the cap plate 100. As described above, the first and second current collecting terminals 115 and 125 may be insulated from the cap plate 100 by the seal gaskets 113 and 123 that are placed around the terminal holes 100', and the insulative members 114 and 124 respectively disposed under the seal gaskets 113 and 123.

The first and second current collecting terminals 115 and 125 may be electrically connected to the electrode assembly 150 through the first and second current collecting members 117 and 127, respectively. The first and second current collecting members 117 and 127 may respectively include current collecting plates 117b and 127b that form lower portions of the first and second current collecting members 117 and 127 and are coupled to the electrode assembly 150, and lead portions 117a and 127a that form upper portions of the first and second current collecting members 117 and 127 and are coupled to the first and second current collecting terminals 115 and 125.

The current collecting plates 117b and 127b may be coupled to lateral sides of the electrode assembly 150. For example, the current collecting plates 117b and 127b may be welded to non-coated portions located on the lateral sides of the electrode assembly 150, for example, to portions of the first and second electrode plates 151 and 152 of the electrode assembly 150 which are not coated with electrode active materials. For example, the current collecting plate 117b may be coupled to the non-coated portion of the first electrode plate 151, and the current collecting plate 127b may be coupled to the non-coated portion of the second electrode plate 152.

The lead portions 117a and 127a may extend from the current collecting plates 117b and 127b at an angle (e.g., at a predetermined angle) to face the first and second current collecting terminals 115 and 125, respectively. In addition, terminal openings (e.g., terminal holes) may be formed in the lead portions 117a and 127a and may receive the first and second current collecting terminals 115 and 125. For example, portions of the first and second current collecting terminals 115 and 125 may be inserted into the terminal holes of the lead portions 117a and 127a, and may be welded to the lead portions 117a and 127a along the terminal holes.

The first and second terminal plates 111 and 121 may be disposed on the cap plate 100. The first and second terminal plates 111 and 121 may be respectively electrically connected to the first and second current collecting terminals 115 and 125 and may provide terminal regions that are wider than the first and second current collecting terminals 115 and 125. The first and second terminal plates 111 and 121 may be respectively connected to the first and second current collecting terminals 115 and 125 by riveting. However, the present invention is not limited thereto. For example, any other suitable method such as a welding method or a screw coupling method may be used to connect the first and second terminal plates 111 and 121 to the first and second current collecting terminals 115 and 125.

Terminal openings (e.g., terminal holes) 111' and 121' may be respectively formed in the first and second terminal plates 111 and 121 so that the first and second current collecting terminals 115 and 125 may be respectively inserted through the terminal holes 111' and 121'. The first and second terminal plates 111 and 121 may have different polarities.

A current limiting plate 112 may be disposed between the cap plate 100 and the first terminal plate 111. In some exemplary embodiments, the current limiting plate 112 may be disposed between the cap plate 100 and the first terminal plate 111. As described above, the current limiting plate 112 electrically connects the cap plate 100 and the first terminal plate 111 to each other.

The current limiting plate 112 may electrically connect the cap plate 100 and the first terminal plate 111 to each other, and an insulative plate 122 may be disposed between the cap plate 100 and the second terminal plate 121 to electrically insulate the cap plate 100 and the second terminal plate 121 from each other. The secondary battery may include the first and second terminal plates 111 and 121 having different polarities. The first terminal plate 111 having a first polarity may be electrically connected to the cap plate 100 through the current limiting plate 112, and the second terminal plate 121 having a second polarity that is different from the first polarity of the first terminal plate 111 may be insulated from the cap plate 100 by the insulative plate 122. As used herein, a terminal plate described in relation with the current limiting plate 112 may be the first terminal plate 111. Similarly, a terminal plate described in relation with the insulative plate 122 may be the second terminal plate 121. The first and second terminal plates 111 and 121 may be positive and negative terminal plates, respectively. However, the present invention is not limited thereto. For example, the first and second terminal plates 111 and 121 may be negative and positive terminal plates, respectively.

Figure 4A:
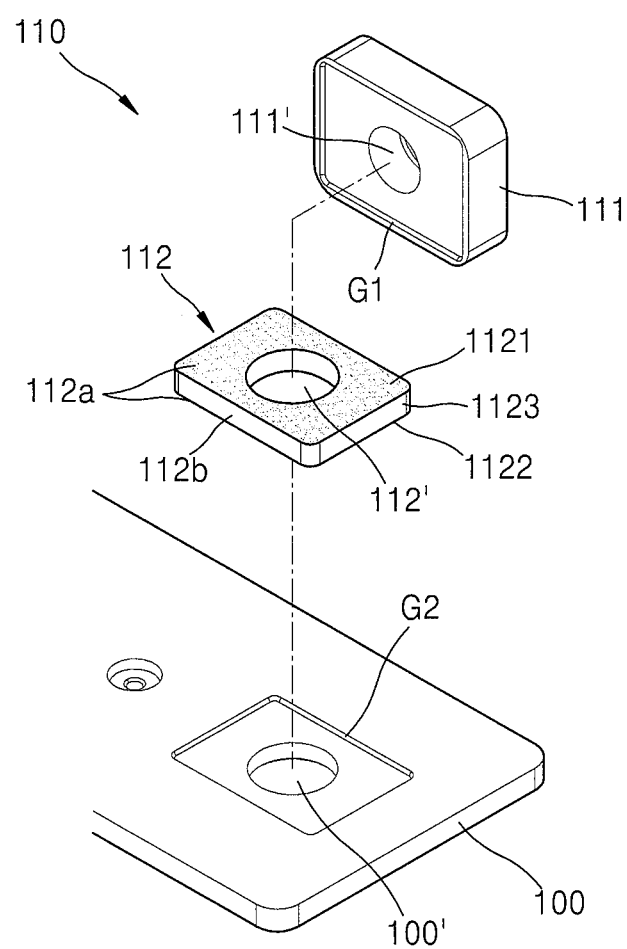
FIG. 4A is an exploded perspective view illustrating a first electrode terminal of the secondary battery depicted in FIG. 1.
Figure 4B:
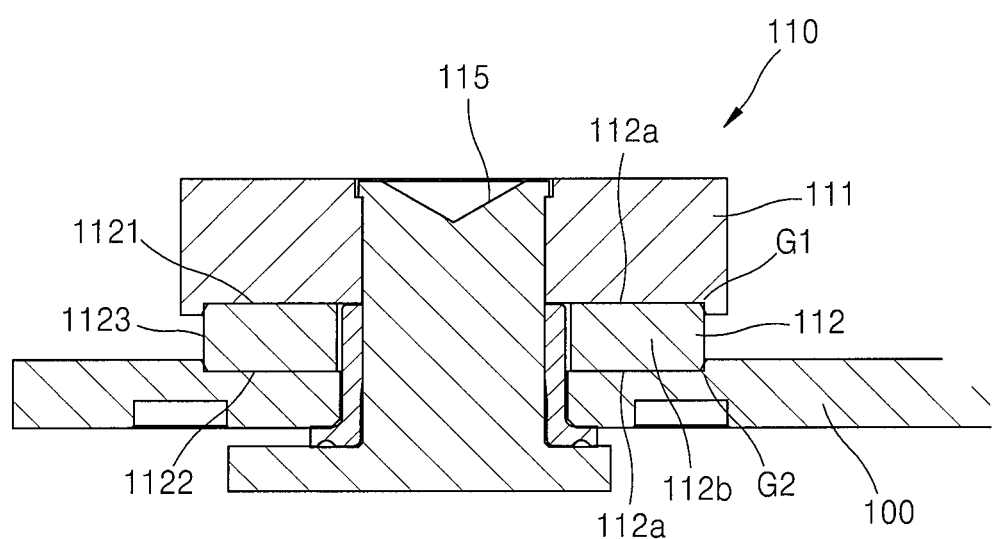
FIG. 4B is an enlarged cross-sectional view illustrating the first electrode terminal of the secondary battery depicted in FIG. 1.

FIG. 4A is an exploded perspective view illustrating the first electrode terminal 110 and FIG. 4B is a cross-sectional view illustrating the first electrode terminal 110. The current limiting plate 112 and a coupling structure of the current limiting plate 112 are described below.

In the secondary battery according to one or more exemplary embodiments of the present invention, the current limiting plate 112 may form a current path that connects the first electrode terminal 110 and the case 190 (e.g., the cap plate 100). As described above, the current limiting plate 112 allows current to flow through the case 190. Therefore, when the secondary battery abnormally operates, the electrode assembly 150 may be externally short-circuited through the case 190, and thus electricity accumulated in the electrode assembly 150 may be discharged within a short amount of time.

For example, when the secondary battery abnormally operates, the first and second electrode terminals 110 and 120 having different polarities may be short-circuited through the current limiting plate 112, the case 190, and an external short-circuit unit 130, and thus electricity accumulated in the electrode assembly 150 may be rapidly discharged to prevent accidents, such as explosions or fires. As such, the current limiting plate 112 may have a sufficient degree of electric conductivity to form a short circuit when the secondary battery abnormally operates.

In addition, the current limiting plate 112 limits a current that flows between the first electrode terminal 110 and the cap plate 100. For example, because the current limiting plate 112 limits a current flowing in the case 190 (e.g., the cap plate 100), safety of the secondary battery may be improved (e.g., guaranteed) even when an external conductor penetrates the case 190.

For example, the current limiting plate 112 has a limited degree of electric conductivity so that current flowing through the case 190 may be limited when an external conductor penetrates the case 190. For example, when (or if) an external conductor is inserted into the secondary battery, the case 190 and the electrode assembly 150 may be electrically connected to each other through the external conductor, and thus a high short-circuit current may flow (e.g., momentarily flow) in the electrode assembly 150 to result in accidents such as explosions or fires. As such, because the current limiting plate 112 limits the high short-circuit current flowing to the electrode assembly 150, the electrode assembly 150 may not explode or catch on fire.

The current limiting plate 112 may include a first surface (e.g., an upper surface or an upper main surface) 1121 that faces the first terminal plate 111, a second surface (e.g., a lower surface or a lower main surface) 1122 that faces the cap plate 100, and a third surface (e.g., a lateral surface) 1123 between the first and second surfaces 1121 and 1122. Herein, the main surfaces (e.g., the upper and lower surfaces) of the current limiting plate 112 may be the largest surfaces of the current limiting plate 112 (or may have the largest surface areas).

The first surface 1121 of the current limiting plate 112 may be an insulative surface. As used herein, the term "insulative surface" refers to a surface having a low degree of electric conductivity and thus capable of interrupting current. For example, an insulative coating layer 112a may form the first surface 1121 of the current limiting plate 112. In some exemplary embodiments, a polytetrafluoroethylene coating layer (e.g., a TEFLON® coating layer) (TEFLON® is a registered trademark of the Chemours Company FC, LLC, Wilmington, Del.) may form the first surface 1121.

The second surface 1122 of the current limiting plate 112 may also be an insulative surface. For example, an insulative coating layer 112a may form the second surface 1122 of the current limiting plate 112. In some exemplary embodiments, a TEFLON® coating layer may form the second surface 1122.

The third surface 1123 of the current limiting plate 112 may be a conductive surface. As used herein, the term "conductive surface" refers to a surface having a sufficient degree of electric conductivity to conduct current. For example, a metal plate may form the third surface 1123 of the current limiting plate 112.

In some exemplary embodiments, the current limiting plate 112 may include a metal plate 112b and an insulative coating layer(s) 112a formed on at least one of main surfaces of the metal plate 112b. For example, insulating coating layers 112a may be formed on upper and lower main surfaces of the metal plate 112b. The insulative coating layers 112a that are disposed on the upper and lower main surfaces of the metal plate 112b may form insulative surfaces, and an exposed lateral surface of the metal plate 112b may form a conductive surface.

The current limiting plate 112 is disposed between the first terminal plate 111 and the cap plate 100. A first accommodation portion G1 may be formed on the first terminal plate 111 to accommodate the first surface 1121 of the current limiting plate 112. In some embodiments, the first accommodation portion G1 of the first terminal plate 111 may accommodate a portion of the third surface 1123 of the current limiting plate 112 together with the first surface 1121 of the current limiting plate 112. For example, the first accommodation portion G1 of the first terminal plate 111 may accommodate the first surface 1121 and an upper portion of the third surface 1123 of the current limiting plate 112.

As used herein, the phrase "the first accommodation portion G1 of the first terminal plate 111 accommodates the first surface 1121 and a portion of the third surface 1123 of the current limiting plate 112" means that in some embodiments, the first accommodation portion G1 surrounds a periphery of the first surface 1121.

As used herein, the periphery of the first surface 1121 of the current limiting plate 112 may refer to a periphery along which the first surface 1121 and the third surface 1123 meet. In addition, the phrase "the first terminal plate 111 covers the periphery of the first surface 1121 of the current limiting plate 112," as used herein, means that in some embodiments, the first terminal plate 111 covers the periphery of the first surface 1121 along which the first surface 1121 and the third surface 1123 meet, while the first terminal plate 111 covers the first surface 1121 and a portion of the third surface 1123 of the current limiting plate 112.

As described further below, the first terminal plate 111 and the current limiting plate 112 may be electrically connected to each other through the third surface 1123 of the current limiting plate 112. For example, the first terminal plate 111 may accommodate the current limiting plate 112 while contacting the first surface 1121 and the third surface 1123 of the current limiting plate 112. Because the third surface 1123 is a conductive surface (unlike the first surface 1121, which is an insulative surface), current may flow between the first terminal plate 111 and the current limiting plate 112 through the third surface 1123. As such, the first accommodation portion G1 of the first terminal plate 111 may be in direct contact with the third surface 1123 of the current limiting plate 112.

The first accommodation portion G1 of the first terminal plate 111 may have an area (e.g., a surface area) that is larger than an area (e.g., a surface area) of the current limiting plate 112 to accommodate an entire main surface of the current limiting plate 112. For example, the first accommodation portion G1 of the first terminal plate 111 may entirely surround an outer periphery of the current limiting plate 112, e.g., the periphery of the first surface 1121 of the current limiting plate 112. The first accommodation portion G1 may continuously surround the outer periphery of the current limiting plate 112.

The first accommodation portion G1 of the first terminal plate 111 may have a recessed shape. For example, the first accommodation portion G1 may have a shape that corresponds to the shape of the current limiting plate 112. The first accommodation portion G1 may include a recess that accommodates the current limiting plate 112 and a border that defines the recess and covers a periphery of the current limiting plate 112.

The first terminal plate 111 and the current limiting plate 112 may be coupled to each other by a press fitting method. For example, the current limiting plate 112 may be press-fitted into the first accommodation portion G1 of the first terminal plate 111. For example, when the current limiting plate 112 is accommodated in the first accommodation portion G1 of the first terminal plate 111, the current limiting plate 112 may be in tight contact (or close contact) with the first accommodation portion G1. As described above, because the current limiting plate 112 and the first terminal plate 111 are brought into tight contact with each other by a press fitting method, current may flow between the current limiting plate 112 and the first terminal plate 111. That is, although a press-fastening structure is not used to join the current limiting plate 112 and the first terminal plate 111, current may flow between the current limiting plate 112 and the first terminal plate 111.

A second accommodation portion G2 may be formed on the cap plate 100 to accommodate the second surface 1122 of the current limiting plate 112. As such, the second accommodation portion G2 of the cap plate 100 may accommodate another portion of the third surface 1123 of the current limiting plate 112 together with the second surface 1122 of the current limiting plate 112. For example, the second accommodation portion G2 may accommodate the second surface 1122 and a lower portion of the third surface 1123 of the current limiting plate 112.

As used herein, the expression "the second accommodation portion G2 of the cap plate 100 accommodates the second surface 1122 and another portion of the third surface 1122 of the current limiting plate 112" means that in some embodiments, the second accommodation portion G2 surrounds a periphery of the second surface 1122.

The periphery of the second surface 1122 of the current limiting plate 112 may refer to a periphery along which the second surface 1122 and the third surface 1122 meet. In addition, as used herein, the expression "the cap plate 100 covers the periphery of the second surface 1122 of the current limiting plate 112" means that in some embodiments the cap plate 100 covers the periphery of the second surface 1122 along which the second surface 1122 and the third surface 1123 meet, while the cap plate 100 covers the second surface 1122 and another portion of the third surface 1123 of the current limiting plate 112.

As described further below, the cap plate 100 and the current limiting plate 112 may be electrically connected to each other through the third surface 1123 of the current limiting plate 112. For example, the cap plate 100 may accommodate the current limiting plate 112 while contacting the second surface 1122 and the third surface 1123 of the current limiting plate 112, and because the third surface 1123 is a conductive surface (unlike the second surface 1122, which is an insulative surface), current may flow between the cap plate 100 and the current limiting plate 112 through the third surface 1123. As such, the second accommodation portion G2 of the cap plate 100 may be in direct contact with the third surface 1123 of the current limiting plate 112.

The second accommodation portion G2 of the cap plate 100 may have a surface area that is larger than the surface area of the current limiting plate 112 so as to entirely accommodate the current limiting plate 112. For example, the second accommodation portion G2 may entirely surround the outer periphery of the current limiting plate 112 (e.g., the periphery of the second surface 1122 of the current limiting plate 112). The second accommodation portion G2 may continuously surround the outer periphery of the current limiting plate 112.

The second accommodation portion G2 of the cap plate 100 may have a recessed shape. For example, the second accommodation portion G2 may have a shape that corresponds to the shape of the current limiting plate 112. The second accommodation portion G2 may include a recess that accommodates the current limiting plate 112 and a border that defines the recess and covers the periphery of the current limiting plate 112.

The cap plate 100 and the current limiting plate 112 may be coupled to each other by a press fitting method. For example, the current limiting plate 112 may be press-fitted into the second accommodation portion G2 of the cap plate 100. For example, when the current limiting plate 112 is accommodated in the second accommodation portion G2 of the cap plate 100, the current limiting plate 112 may be in tight contact (or close contact) with the second accommodation portion G2. As described above, because the current limiting plate 112 and the cap plate 100 are brought into tight contact with each other by a press fitting method, current may flow between the current limiting plate 112 and the cap plate 100. That is, although a press-fastening structure is not used to join the current limiting plate 112 and the cap plate 100, current may flow between the current limiting plate 112 and the cap plate 100.

The first terminal plate 111 and the cap plate 100 may be electrically connected to each other through the third surface 1123 of the current limiting plate 112. For example, the first accommodation portion G1 of the first terminal plate 111 and the second accommodation portion G2 of the cap plate 100 may be in contact with the third surface 1123 of the current limiting plate 112 and may be electrically connected to each other through the third surface 1123 of the current limiting plate 112. As such, the first terminal plate 111 and the cap plate 100 are electrically connected to each other through the third surface 1123 of the current limiting plate 112 and are insulated by the first and second surfaces 1121 and 1122 that are insulative surfaces. That is, because the conduction area between the first terminal plate 111 and the cap plate 100 is limited to the third surface 1123 of the current limiting plate 112, the amount of current flowing between the first terminal plate 111 and the cap plate 100 may be limited.

The current limiting plate 112 is configured to limit the amount of current flowing between the first terminal plate 111 and the cap plate 100. Therefore, when the secondary battery abnormally operates, an external short circuit may be formed through the case 190 (for example, the cap plate 100). However, when an external conductor penetrates the case 190, current flowing through the case 190 may be limited by the current limiting plate 112, and thus a high current may not flow in the electrode assembly 150 through the external conductor and the case 190.

As used herein, the expression "the conduction area between the first terminal plate 111 and the cap plate 100 is limited to the third surface 1123 of the current limiting plate 112" means that in some embodiments, the first terminal plate 111 and the cap plate 100 may not be connected to each other through the first and second surfaces 1121 and 1122 of the current limiting plate 112, and the first terminal plate 111 and the cap plate 100 may not be directly connected to each other. As such, the first terminal plate 111 and the cap plate 100 may be spaced apart from each other with a middle portion of the third surface 1123 of the current limiting plate 112 being disposed therebetween. For example, the first accommodation portion G1 of the first terminal plate 111 accommodates the upper portion of the third surface 1123 of the current limiting plate 112, and the second accommodation portion G2 of the cap plate 100 accommodates the lower portion of the third surface 1123 of the current limiting plate 112. Thus, unlike the upper and lower portions of the third surface 1123, the middle portion of the third surface 1123 may not be covered by the first and second accommodation portions G1 and G2. As such, the middle portion of the third surface 1123 may be exposed to the outside. Therefore, the first terminal plate 111 and the cap plate 100 may be spaced apart from each other with the exposed middle region of the third surface 1123 of the current limiting plate 112 being disposed therebetween.

In the present exemplary embodiment, the first and second terminal plates 111 and 121, which have different polarities, may be disposed on the cap plate 100. The first and second terminal plates 111 and 121 may be respectively electrically connected to the first and second electrode plates 151 and 152 of the electrode assembly 150 through the first and second current collecting members 117 and 127.

As described above, the current limiting plate 112 is disposed between the first terminal plate 111 and the cap plate 100 to electrically connect the first terminal plate 111 and the cap plate 100 to each other.

Referring to FIG. 2, the insulative plate 122 is disposed between the second terminal plate 121 and the cap plate 100 so as to electrically insulate the second terminal plate 121 and the cap plate 100 from each other.

Terminal openings (e.g., terminal holes) 112' and 122' are respectively formed in the current limiting plate 112 and the insulative plate 122 and respectively receive the first and second current collecting terminals 115 and 125. For example, the first current collecting terminal 115 may be fixed by placing the current limiting plate 112 between the cap plate 100 and the first terminal plate 111, inserting the first current collecting terminal 115 sequentially through the terminal holes 100', 112', and 111' of the cap plate 100, the current limiting plate 112, and the first terminal plate 111, respectively, in a direction from the lower side of the cap plate to the upper side of the cap plate 100, and riveting the upper end of the first current collecting terminal 115 protruding from the first terminal plate 111 to the first terminal plate 111.

Similarly, the second current collecting terminal 125 may be fixed by placing the insulative plate 122 between the cap plate 100 and the second terminal plate 121, inserting the second current collecting terminal 125 sequentially through the terminal holes 100', 122', and 121' of the cap plate 100, the insulative plate 122, and the second terminal plate 121, respectively, in a direction from the lower side of the cap plate 100 to the upper side of the cap plate 100, and riveting the upper end of the second current collecting terminal 125 protruding from the second terminal plate 121 to the second terminal plate 121.

A short-circuit tab 132 and the insulative plate 122 are disposed between the second terminal plate 121 and the cap plate 100. The short-circuit tab 132 contacts the second terminal plate 121 and is electrically connected to the second terminal plate 121. For example, the short-circuit tab 132 and the second terminal plate 121 overlap with each other and are coupled to the cap plate 100 with the insulative plate 122 being disposed on the cap plate 100 under the short-circuit tab 132 and the second terminal plate 121. As such, the second terminal plate 121 and the short-circuit tab 132 protruding from the second terminal plate 121 along the cap plate 100 may be insulated from the cap plate 100 by the insulative plate 122.

The short-circuit tab 132 may be a part of the external short-circuit unit 130. With reference to FIGS. 2 and 3, an operation of the external short-circuit unit 130 is described below. The external short-circuit unit 130 includes the short-circuit tab 132 and a short-circuit member 131 that are short-circuited or separated from each other according to the internal pressure of the secondary battery.

The short-circuit tab 132 may be electrically connected to the second terminal plate 121 but may be electrically insulated from the cap plate 100 connected to the first terminal plate 111. For example, the short-circuit tab 132 may extend from the second terminal plate 121 above the cap plate 100, and the insulative plate 122 may be disposed between the short-circuit tab 132 and the cap plate 100. For example, the second terminal plate 121 and the short-circuit tab 132 overlap with each other, (e.g., contact each other), and are coupled to the cap plate 100 with the insulative plate 122 disposed on the cap plate 100 under the second terminal plate 121 and the short-circuit tab 132 to insulate the short-circuit tab 132 and the second terminal plate 121 from the cap plate 100.

The short-circuit member 131 may be disposed in an opening (e.g., a hole) of the cap plate 100. For example, the short-circuit member 131 may be electrically connected to the cap plate 100 and may include a conductive thin metal plate. Because the short-circuit member 131 includes an easily deformable thin metal plate, the short-circuit member 131 may have a downwardly concave shape and may be separate (or spaced) from the short-circuit tab 132 when the secondary battery normally operates. However, when the internal pressure of the case 190 abnormally increases to a certain value or higher, the short-circuit member 131 may turn into an upwardly convex shape and make contact with the short-circuit tab 132, thereby forming an external short circuit.

For example, when the short-circuit member 131 is coupled to the cap plate 100, the short-circuit member 131 may have a downwardly concave shape, and when the internal pressure of the case 190 increases to a preset critical value or higher, the short-circuit member 131 may turn into an upwardly convex shape in response to the increased internal pressure of the case 190. Then, the short-circuit member 131 may contact the short-circuit tab 132. When the short-circuit member 131 connected to the cap plate 100 contacts the short-circuit tab 132 connected to the second terminal plate 121, a short-circuit current path is formed between the cap plate 100 and the second terminal plate 121. Because the cap plate 100 is connected to the first terminal plate 111 through the current limiting plate 112, opposite polarities of the secondary battery are eventually electrically connected to each other through the external short-circuit unit 130. That is, the electrode assembly 150 is externally short-circuited, and thus electricity accumulated in the electrode assembly 150 is discharged quickly. Therefore, accidents, such as explosions or fires, may be prevented or reduced. An insulative cover 135 may insulate the external short-circuit unit 130 from the outside.

Figure 5:
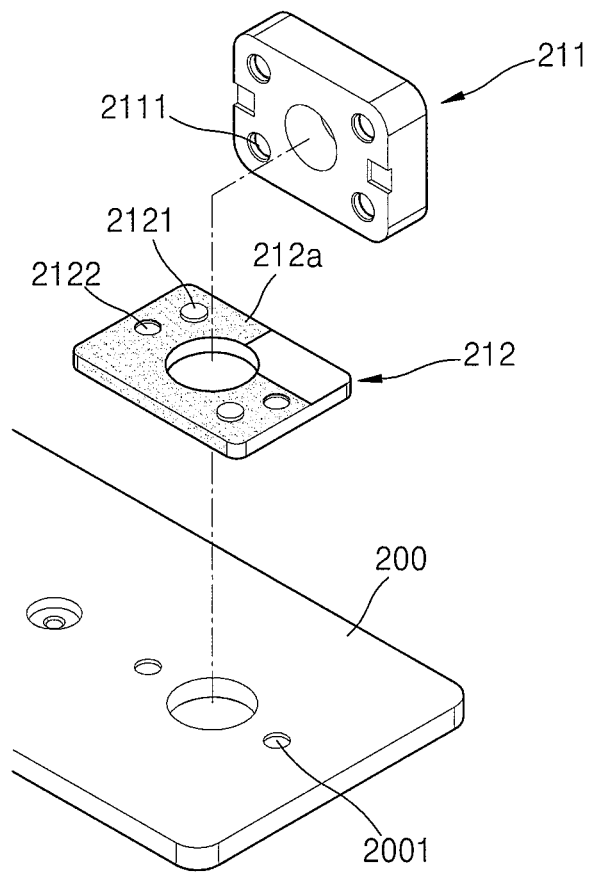
FIG. 5 is an exploded perspective view illustrating a comparative example of an electrode terminal of a secondary battery for comparison with the exemplary embodiment.

FIG. 5 is an exploded perspective view illustrating a current limiting plate 212 of a secondary battery and a coupling structure of the current limiting plate 212 according to a comparative example for comparison with the exemplary embodiment.

Referring to FIG. 5, the current limiting plate 212 of the comparative example is disposed between a terminal plate 211 and a cap plate 200. The current limiting plate 212 includes protrusions 2121 that protrude toward the terminal plate 211 and protrusions 2122 that protrude toward the cap plate 200. The protrusions 2122 are illustrated as having a concave shape in FIG. 5 because the protrusions 2122 are formed on a surface of the current limiting plate 212 that faces the cap plate 200 by pressing the opposite surface of the current limiting plate 212 toward the cap plate 200.

The current limiting plate 212 is coupled to the terminal plate 211 and the cap plate 200 by the protrusions 2121 and 2122. For example, recesses 2111 and 2001 are respectively formed in the terminal plate 211 and the cap plate 200 to receive the protrusions 2121 and 2122 of the current limiting plate 212. Upper and lower surfaces of the current limiting plate 212 are not flat because of the protrusions 2121 and 2122 and the recesses 2111 and 2001.

In the comparative example, the current limiting plate 212 is coupled to the terminal plate 211 and the cap plate 200 using the protrusions 2121 and 2122 and the recesses 2111 and 2001. However, this coupling structure may increase the number of manufacturing processes and manufacturing costs. Referring to FIG. 4A, according to one or more embodiments of the present invention, protrusions or recesses may not be formed on the first and second surfaces 1121 and 1122 of the current limiting plate 112. That is, as the first terminal plate 111 and the cap plate 100 surround the outer periphery of the current limiting plate 112, the current limiting plate 112 is aligned with the first terminal plate 111 and the cap plate 100. Thus, it may be unnecessary to use additional protrusions or recesses.

In the comparative example, however, the current limiting plate 212 is coupled to the terminal plate 211 and the cap plate 200 by fitting the protrusions 2121 and 2122 into the recesses 2111 and 2001, respectively. Thus, the resistance of the coupling structure to rotation and/or twisting is determined by the rotational resistance of the protrusions 2121 and 2122 in the recesses 2111 and 2001. The coupling areas between the protrusions 2121 and 2122 and the recesses 2111 and 2001 are limited to local areas, and the contact surfaces between the protrusions 2121 and 2122 and the recesses 2111 and 2001 form relatively short moment arms with respect to the center of the terminal plate 211. Therefore, the resistance of the coupling structure to rotation is low.

According to one or more exemplary embodiments of the present invention, however, the coupling areas between the current limiting plate 112, the first terminal plate 111, and the cap plate 100 are relatively large because the first and second accommodation portions G1 and G2 of the first terminal plate 111 and the cap plate 100 entirely surround the outer periphery of the current limiting plate 112. Therefore, resistance of the coupling structure to rotation and/or twisting may be relatively high. In addition, the first and second accommodation portions G1 and G2 that surround the outer periphery of the current limiting plate 112 form relatively long moment arms relative to the center of the first terminal plate 111, and thus the resistance of the coupling structure to rotation may be high. Particularly, in the present exemplary embodiment, because the first and second accommodation portions G1 and G2 entirely surround the outer periphery of the current limiting plate 112, the coupling areas between the current limiting plate 112 and the first and second accommodation portions G1 and G2 are relatively large. Thus, the resistance of the coupling structure to rotation may be increased.

In the comparative example, the current limiting plate 212 has a limited conductive surface which limits the amount of current flowing between the terminal plate 211 and the cap plate 200. Referring to FIG. 5, an insulative coating layer 212a is partially formed on the current limiting plate 212. Thus, a region of the current limiting plate 212 in which the insulative coating layer 212a is formed functions as an insulative surface, and a region of the current limiting plate 212 in which the insulative coating layer 212a is not formed functions as a conductive surface. However, a patterning process such as a masking process may be necessary to form the insulative coating layer 212a partially in a region of the current limiting plate 212, and thus manufacturing costs may increase because of the patterning process.

In the present exemplary embodiment, the insulative coating layers 112a that function as insulative surfaces are entirely formed on the first and second surfaces 1121 and 1122, and thus an additional patterning process may not be necessary to form the insulative coating layers 112a. Thus, manufacturing costs may decrease.

In the comparative example, the current limiting plate 212 is disposed between the terminal plate 211 and the cap plate 200 by simply stacking the terminal plate 211, the current limiting plate 212, and the cap plate 200. Thus, the insulative coating layer 212a of the current limiting plate 212 is not completely covered with the terminal plate 211 and the cap plate 200, but is exposed to the outside. For example, a portion of an upper surface of the current limiting plate 212 is not covered with the terminal plate 211. For example, the insulative coating layer 212a may be a TEFLON® coating layer and may be stripped or altered by chemicals. As such, an insulative area provided by the insulative coating layer 212a may be reduced, or the electrical insulative properties of the insulative coating layer 212a may deteriorate. That is, the performance of the current limiting plate 212 may vary and may not satisfy design requirements.

However, according to one or more exemplary embodiments of the present invention, because the first and second accommodation portions G1 and G2 of the first terminal plate 111 and the cap plate 100 entirely surround the outer periphery of the current limiting plate 112 and the first and second surfaces 1121 and 1122 are insulative surfaces (e.g., the insulative coating layers 112a), the first and second surfaces 1121 and 1122 may be completely covered by the first and second accommodation portions G1 and G2 of the first terminal plate 111 and the cap plate 100, respectively. Therefore, the insulative coating layers 112a may not be stripped or altered by chemicals.

As described above, according to the one or more exemplary embodiments of the present invention, the current limiting plate 112 allows a limited amount of current to flow between the first terminal plate 111 and the cap plate 100, and the current limiting plate 112 is coupled to the cap plate 100 by the first and second accommodation portions G1 and G2 entirely surrounding the current limiting plate 112. Therefore, the secondary battery may have a simple assembling structure and may be manufactured with low costs.

In addition, the first and second surfaces 1121 and 1122 of the current limiting plate 112 are entirely insulative, and the third surface 1123 of the current limiting plate 112 allows current to flow between the first terminal plate 111 and the cap plate 100. Therefore, the current flow between the first terminal plate 111 and the cap plate 100 may be restrictively allowed, and the first and second surfaces 1121 and 1122 may be coated with an insulative material without a masking or patterning process.

The current limiting plate 112 is coupled using the first and second accommodation portions G1 and G2 entirely surrounding the current limiting plate 112, and thus the insulative surfaces of the current limiting plate 112 may be protected from the environment. For example, the insulative surfaces of the current limiting plate 112 may not be stripped or altered by chemicals. In addition, the coupling areas between the current limiting plate 112 and the first and second accommodation portions G1 and G2 are relatively large, and the first and second accommodation portions G1 and G2 surrounding peripheries of the current limiting plate 112 form long moment arms. Therefore, resistance to rotation and/or twisting may be increased.

It is to be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims and their equivalents.

What is claimed is:

1. A secondary battery comprising:
   an electrode assembly;
   a cap plate;
   a first terminal plate electrically connected to the electrode assembly, the first terminal plate being on the cap plate; and
   a current limiting plate between the first terminal plate and the cap plate, the current limiting plate comprising:
      a first surface accommodated in a first accommodation portion of the terminal plate;
      a second surface accommodated in a second accommodation portion of the cap plate; and
      a third surface extending between the first and second surfaces,
   wherein a first portion of the third surface is accommodated in the first accommodation portion, and
   wherein a second portion of the third surface is accommodated in the second accommodation portion.

2. The secondary battery of claim 1, wherein the first and second surfaces are main surfaces of the current limiting plate and opposite to each other, and
   wherein the third surface is a lateral surface of the current limiting plate.

3. The secondary battery of claim 1, wherein a third portion of the third surface of the current limiting plate is not covered by the first and second accommodation portions.

4. The secondary battery of claim 3, wherein the third portion is exposed.

5. The secondary battery of claim 1, wherein the first accommodation portion defines a recess in the first terminal pate, and
   wherein the second accommodation portion defines a recess in the cap plate.

6. The secondary battery of claim 1, wherein the first and second accommodation portions are press fitted together.

7. The secondary battery of claim 1, wherein the first and second accommodation portions entirely surround an outer periphery of the current limiting plate.

8. The secondary battery of claim 1, wherein the first and second accommodation portions continuously surround an outer periphery of the current limiting plate.

9. The secondary battery of claim 1, wherein the first accommodation portion surrounds a periphery along which the first and third surfaces of the current limiting plate meet, and
   wherein the second accommodation portion surrounds a periphery along which the second and third surfaces of the current limiting plate meet.

10. The secondary battery of claim 1, wherein the first and second surfaces of the current limiting plate comprise insulative surfaces.

11. The secondary battery of claim 10, wherein the first and second surfaces of the current limiting plate comprise polytetrafluoroethylene coating layers.

12. The secondary battery of claim 1, wherein the third surface of the current limiting plate comprises a conductive surface.

13. The secondary battery of claim 12, wherein the current limiting plate comprises a metal plate comprising insulative coating layers on the first and second surfaces thereof.

14. The secondary battery of claim 1, wherein the first and second surfaces of the current limiting plate are substantially flat.

15. The secondary battery of claim 1, wherein the first and second accommodation portions directly contact the third surface of the current limiting plate.

16. The secondary battery of claim 1, wherein the first terminal plate and the cap plate are electrically connected to each other through the third surface of the current limiting plate.

17. The secondary battery of claim 1, wherein penetration openings are defined in the cap plate, in the current limiting plate, and in the first terminal plate for receiving a current collecting terminal that extends from the electrode assembly.

18. The secondary battery of claim 1, wherein the secondary battery further comprises a second terminal plate having a polarity that is different from a polarity of the first terminal plate.

19. The secondary battery of claim 18, further comprising an insulative plate between the second terminal plate and the cap plate.

* * * * *